Patented Feb. 27, 1951

2,543,083

UNITED STATES PATENT OFFICE 2,543,083

RECOVERY OF CAROTENE CONCENTRATE

Jonathan W. White, Jr., Joseph Naghski, and Leopold Weil, Philadelphia, Pa., assignors to the United States of America as represented by the Secretary of Agriculture No Drawing. Application February 18, 1946,
Serial No. 648,549

5 Claims. (Cl. 195—2)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the recovery of carotene in concentrated form from fleshy carotene-containing plant tissue such as carrots, sweet potatoes and squash, and has among its objects the obtaining of a carotene concentrate in an efficient and economical manner.

In general, according to the invention, the fleshy carotene-containing plant tissue is preferably but not necessarily pulped, and then fermented with *Clostridium roseum*, thus to digest and dissolve a large portion of the constituents, such as the cellulose cell walls, sugars, starches, a portion of the protein, and other materials, but not the carotene, thereby to liberate the cell contents containing the carotene.

At the end of the fermentation, a thick orange-colored sludge containing the carotene floats on the surface of the fermentation mass. The factors responsible for the floating may be due to the chemical and colloidal make-up of the sludge and partly to the entrapped gas formed during the fermentation. The fermentation liquor underneath the sludge is practically free of carotene, and can be siphoned off to separate the sludge from the fermentation mass, and be discarded or worked up for recovery of the solvents produced by the fermentation, or the sludge may be separated from the mass in any way desired.

The sludge is then stirred with water, neutralized, a salt of polyvalent metal added if desired, and boiled for a few minutes to cause coagulation of a fraction containing the carotene. The boiled mixture is then screened to free it of tissue debris. The coagulated carotene-containing fraction precipitates on cooling and will settle by gravity or may be removed by centrifuging or filtering.

The precipitate may be used in this form as a carotene concentrate, or it may be dried in any suitable manner and used as such, or it may be subjected to extraction by organic solvents for the recovery of a yet purer carotene.

Because of the high carbohydrate content of many of the plant tissues, fermentation of the fresh plant material leads to the formation of a slimy polysaccharide which interferes with later steps in the operation. This can be avoided, however, by grinding, boiling, and straining the tissues which give this trouble prior to fermentation, thereby eliminating a large part of the slime-forming carbohydrate. The boiling of the plant tissue may be carried out in the absence of air in order to prevent oxidative decomposition of the carotene, and then stored for later processing. Sufficient water is added to the boiled and strained plant tissue, and it is inoculated with a vigorous growing culture of the fermentation micro-organism, and incubated for a sufficient period, usually three to four days, under anaerobic condition at 35° C.

When organisms are used which do not produce gas, the carotene-containing material may not rise to the surface as a sludge. In this case, the whole fermentation mixture may be coagulated and worked up as described above relative to the sludge.

The following examples exhibit the invention more specifically:

*Example I*

30.67 kg. of fresh carrot roots, corresponding to 2.96 kg. of dry weight with a carotene content of 625 micrograms per g. dry weight, was ground and steeped in 45 liters of water at 90° C. for 30 minutes and was then strained for the purpose of removing slime-forming carbohydrates. The strained carrot pulp was made up to 60 liters with tap water, inoculated with 7.0 liters of an 18-hour culture of *Clostridium roseum* and fermented anaerobically (in $CO_2$ atmosphere) for three days. At the end of the fermentation period, an orange-colored top layer was present amounting to about 5 liters in volume. About 62 liters of the under liquor, containing essentially no carotene, was siphoned off. The top layer then was diluted with 3 liters of water, neutralized and after addition of 60 g. of aluminum sulfate, boiled for 15 minutes. The boiled mixture was then screened through a No. 40 screen in order to remove the corky tissue and other debris. The screened suspension was then placed in the cold room over night, during which time the carotene-containing coagulum settled out. The clear, faintly yellow-colored supernatant liquid was siphoned off, and the carotene-containing sediment was centrifuged and dried in a vacuum oven at 60° C. yielding 191 g. of dry weight with a carotene content of 0.93%. This represents 96.0% recovery of the total carotene and a 15-fold increase in carotene concentration over the original carrot on a dry matter basis, and a 154-fold increase on a fresh weight basis.

As mentioned before, a further purification of the dry carotene concentrate can be obtained by solvent extraction. The advantage of applying solvent extraction at this stage is apparent. Instead of drying the carrots and then extracting the total dry weight (2.96 kg.) as practiced in other methods, in our process only 191 g. need to be extracted, a fact which constitutes a great saving in operation cost and in the amount of solvent required for the extraction. Extraction with petroleum ether of a dry carotene concentrate yielded, after evaporation of the solvent, an oily preparation containing about 6% of carotene, representing a 53-fold increase in carotene concentration over the original dry carrot.

*Example II*

One kg. of sweet potatoes corresponding to 252 g. of dry weight and 806 micrograms carotene, or 3.2 micrograms per g. dry matter, was ground, boiled for 15 minutes in 1.5 liters of water, strained, and the pulp thus obtained was inoculated with 200 cc. of an 18-hour culture of *Clostridium roseum*. The total volume was made up to 2 liters. The boiling of the sweet potato pulp prior to fermentation had the same desired effect as described for the carrot fermentation. After 4 days of anaerobic fermentation, the yellowish-brown top layer was separated, 300 cc. of water added and the mixture was neutralized. After addition of 3 g. of aluminum sulfate, it was boiled for 20 minutes and screened to remove the cork and vascular particles. After cooling over night, the carotene containing fraction had flocculated out. The supernatant liquid was siphoned off and the residue centrifuged and dried at 50° C. in the vacuum oven, yielding 17.4 g. of dry preparation with a carotene content of 904.8 micrograms or 52 micrograms per g. dry matter, representing a 16-fold increase in the concentration of carotene on a dry matter basis, and a complete recovery of the original carotene.

*Example III*

The fermentation of winter squash was carried out the same way as described for the carrot and sweet potato, except that the fresh squash pulp was fermented without any boiling prior to fermentation. The boiling of winter squash pulp slowed down the fermentation, and the resulting carotene-containing fraction was difficult to separate from the mother liquor. One kg. of winter squash pulp, corresponding to 167.8 g. of dry weight and containing 23,493 micrograms of carotene or 142 micrograms carotene per g. dry matter, resulted, after preboiling, fermentation and separating and drying as described above, in 12.9 g. of dry matter containing 23,607 micrograms of carotene, or 1830 micrograms per g. dry matter, representing a 13.1-fold increase in the concentration of carotene on a dry matter basis, and a complete recovery of the original carotene.

Having thus described the invention, what is claimed is:

1. A process of recovering a carotene concentrate comprising, fermenting a fleshy carotene-containing plant tissue with *Clostridium roseum* to digest and dissolve a large portion of the constituents but not the carotene, thereby to liberate the cell contents containing the carotene, and recovering a carotene concentrate from the fermentation mass.

2. The process of claim 1, wherein the plant tissue is carrot roots.

3. The process of claim 1, wherein the plant tissue is sweet potatoes.

4. The process of claim 1, wherein the plant tissue is squash.

5. A process of recovering a carotene concentrate comprising pulping a fleshly carotene-containing plant tissue, boiling and straining the pulped tissue to remove slime-forming carbohydrates, fermenting the resulting plant tissue with *Clostridium roseum* to digest and dissolve a large portion of the constituents but not the carotene, thereby to liberate the cell contents containing the carotene, separating the sludge containing the carotene from the fermentation mass, boiling the sludge with water to cause coagulation of a fraction containing the carotene, and recovering the coagulated fraction from the boiled sludge.

JONATHAN W. WHITE, Jr.
JOSEPH NAGHSKI.
LEOPOLD WEIL.

REFERENCES CITED

The following references are of record in the file of this patent:

UNITED STATES PATENTS

| Number | Name | Date |
|---|---|---|
| 2,182,989 | Jean | Dec. 12, 1939 |
| 2,348,443 | Barnett | May 9, 1944 |

FOREIGN PATENTS

| Number | Country | Date |
|---|---|---|
| 336,477 | Italy | of 1936 |

OTHER REFERENCES

Holmes et al., Chemical Abstracts, 1932, page 1611.

Rysakova, Chemical Abstracts, 1937, page 1855.